United States Patent
Hubbert et al.

(10) Patent No.: US 7,053,813 B1
(45) Date of Patent: May 30, 2006

(54) RADAR SYSTEM

(75) Inventors: John Clark Hubbert, Fort Collins, CO (US); Venkatachalam Chandraskaran, Fort Collins, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 12 days.

(21) Appl. No.: 10/829,602

(22) Filed: Apr. 22, 2004

(51) Int. Cl.
*G01S 13/95* (2006.01)

(52) U.S. Cl. .................................. 342/26 R

(58) Field of Classification Search ............... 342/109, 342/188, 26 B–26 D, 26 R
See application file for complete search history.

(56) References Cited

U.S. PATENT DOCUMENTS

| | | | | |
|---|---|---|---|---|
| 4,730,189 A | * | 3/1988 | Siegel et al. | 342/104 |
| 5,150,125 A | * | 9/1992 | Hager | 342/120 |
| 5,247,303 A | * | 9/1993 | Cornelius et al. | 342/26 D |
| 5,500,646 A | | 3/1996 | Zrnic | |
| 6,061,013 A | * | 5/2000 | Sauvageot et al. | 342/26 R |
| 6,081,221 A | | 6/2000 | Zrnic et al. | |
| 6,204,810 B1 | * | 3/2001 | Smith | 342/365 |
| 6,781,540 B1 | * | 8/2004 | MacKey et al. | 342/188 |
| 6,803,875 B1 | * | 10/2004 | Alford et al. | 342/188 |

OTHER PUBLICATIONS

Hubbert, J. C., et al., "Phase Coding for Polarimetric Radar," National Center for Atmospheric Research, Boulder, Colorado 80307, P4D.2.

Pazmany, Andrew, et al., "Polarization Diversity Pulse-Pair Technique for Millimeter-Wave Doppler Radar Measurements of Severe Storm Features," Journal of Atmospheric and Oceanic Technology, vol. 16, 1999 American Meteorological Society, pp. 1900-1911.

Doviak, R. J., et al., "Considerations for Polarimetric Upgrades to Operational WSR-88D Radars," Journal of Atmospheric and Oceanic Technology, Mar. 2000, vol. 17, pp. 257-278.

Frush, C., et al., "Application of the SZ Phase Code to Mitigate Range-Velocity Ambiguities in Weather Radars," Journal of Atmospheric and Oceanic Technology, Apr. 2002, vol. 19, American Meteorological Society, pp. 413-430.

Hubbert, J. C., et al., "Studies of the Polarimetric Covariance Matrix. Part I: Calibration Methodology," Journal of Atmospheric and Oceanic Technology, vol. 20, Jul. 30, 2002, pp. 696-706.

(Continued)

*Primary Examiner*—Thomas H. Tarcza
*Assistant Examiner*—Matthew Barker
(74) *Attorney, Agent, or Firm*—Setter Ollila LLC

(57) ABSTRACT

A radar system determines the range and velocity of a target, such as an atmospheric structure. The radar system transfers a first series of pulses and a second series of pulses. The first series of pulses and the second series of pulses have orthogonal polarizations. The first series of pulses and the second series of pulses have a same pulse repetition time. The first series of pulses and the second series of pulses are offset by a time amount. The target reflects energy from the first series of pulses to generate a first series of echoes and reflects energy from the second series of pulses to generate a second series of echoes. The radar system processes the first series of echoes and the second series of echoes to determine the range and velocity of the target.

20 Claims, 4 Drawing Sheets

OTHER PUBLICATIONS

Hubbert, J. C., "Range-Velocity Mitigation Via SZ Phase Coding with Experimental S-Band Radar Data," 9B.1, ATD/NCAR, Boulder, Colorado, 31st International Conference on Radar Meterology, Aug. 10, 2003, Seattle, Wash.

Sachidananda, M. et al., "Systematic Phase Codes for Resolving Range Overlaid Signals in a Doppler Weather Radar," Journal of Atmospheric And Oceanic Technology, vol. 16, Oct. 1999, pp. 1351-1363.

Sachidananda, M. et al., "An Improved Clutter Filtering and Spectral Moment Estimation Algorithm for Staggered PRT Sequences," Journal of Atmospheric and Oceanic Technology, vol. 19, Dec. 2002, American Meterological Society, pp. 2009-2019.

Sachidananda, M., "Unambiguous Range Extension by Overlay Resolution in Staggered PRT Technique," Journal of Atmospheric and Oceanic Technology, May 2003, pp. 673-684.

* cited by examiner

RADAR SYSTEM

GOVERNMENT FUNDED INVENTION

The Government may have certain rights to the invention as provided by the terms of Agreement DTFA01-98-00031 awarded by the Federal Aviation Administration.

BACKGROUND OF THE INVENTION

1. Field of the Invention

The invention is related to the field of radar systems, and in particular, to radar systems that transfer pulses at a target to determine the range and velocity of the target.

2. Statement of the Problem

A Doppler weather radar system determines the range and velocity of atmospheric structures, such as wind and precipitation. The Doppler weather radar system transfers pulse trains toward the target structure and receives echoes reflected off of the target structure. The Doppler weather radar system processes the echoes to determine the range and velocity of the atmospheric structure. In addition, the Doppler weather radar system determines other variables, such as differential reflectivity, differential phase, linear depolarization ratio, and co-polar correlation coefficient.

To determine the target range, the radar system determines the time that it takes for a pulse to propagate to the target and for its echo to propagate back to the radar system. The range is then determined based on the expected speed of the pulses/echoes and the elapsed time. However, the echoes from consecutive pulses may be confused by the radar system. For example, a first pulse may reflect off of the target to provide a first echo, and a second pulse may reflect off of the target to provide a second echo. However, the first pulse may continue to propagate and reflect off of another structure that is further away from the radar system than the target structure to produce a third echo. The third echo may arrive at the receiver around the same time as the second echo. The receiver may confuse the two echoes and provide an ambiguous or inaccurate target range. These confounded echoes are referred to as range overlaid echoes in the literature.

To counter the ambiguous range problem, it is desirable to separate consecutive pulses by a relatively long Pulse Repetition Time (PRT). The longer PRT allows all echoes from the first pulse to clear the radar system before the echoes from the second pulse arrive. This prevents the receiver from confusing the echoes of consecutive pulses.

To determine target velocity, the radar system determines the phase shift that occurs between two echoes returned from a common target, since the velocity of the target affects this phase shift according to the Doppler effect. To get proper phase shift data, the target must be sampled at the Nyquist rate or at a higher rate, and these rates require a shorter PRT to adequately sample for unambiguous target velocity.

The velocity determination can be further complicated by the introduction of phase shift that is not attributed to the velocity of the target structure. For example, additional phase shift is introduced to both the pulse and its echo by the particles that are in between the radar system and the target structure. Since this other phase shift is not the Doppler phase shift of interest, the other phase shift introduces ambiguity into the velocity determination.

Unfortunately, larger unambiguous range determination requires a longer PRT, but larger unambiguous velocity determination requires a shorter PRT. This problem of simultaneously obtaining larger unambiguous range and larger unambiguous velocity is termed in the literature as the Doppler Dilemma. It is expressed by the following equation:

$$r_a v_a = c\lambda/8;$$

where $r_a$ is the unambiguous range, $v_a$ is the unambiguous velocity, c is the speed of light, and $\lambda$ is the wavelength of the transmitted radar signal. Various techniques have been tried to simultaneously extend both the unambiguous range and velocity of the target, despite the conflicting pulse repetition requirements.

One technique to handle the range/velocity ambiguity problem is to use dual scans where the first scan has a short PRT for velocity determination, and the second scan has a longer PRT for range determination. Unfortunately, the dual scanning technique may take an undesirable amount of time to perform both scans, and range overlaid echoes can contaminate the short PRT scan.

Another technique to handle the range/velocity ambiguity problem is to alternate the period between the pulses between a short PRT and a long PRT, called a staggered PRT. The unambiguous velocity can be extended to an equivalent uniform PRT of the difference of the long and short PRT periods, while the unambiguous range can be extended to an equivalent uniform PRT of the sum of the long and short PRT. Unfortunately, complex filters are required to remove noise caused by ground clutter when the PRT is alternated.

Another technique to mitigate range-velocity ambiguity is to use systematic phase coding of the transmitted pulses. In this way, the various range overlaid echoes can be separated using the phase code information. This technique works well for two overlaid echoes, but becomes very difficult when three or more echoes are overlaid.

Another technique to handle the range/velocity ambiguity problem is to transfer a first pulse train at a first polarity and with a set pulse repetition time, and to transfer a second pulse train at a second polarity, but with an alternating PRT. The alternating PRT means that, for the second pulse train, a first pulse is transmitted slightly before a corresponding first pulse in the first pulse train, and a second pulse is transmitted slightly after a corresponding second pulse in the first pulse train. Thus, pulses in the second pulse train alternate between transmission slightly before or after pulses in the first pulse train. Unfortunately, the continually alternating PRT adds undesired complexity to ground clutter filtering and to phase coding.

SUMMARY OF THE SOLUTION

Examples of the invention include a radar system and its method of operation. The radar system comprises a transmission system and a reception system. The transmission system is configured to transfer a first series of pulses and a second series of pulses. The first series of pulses and the second series of pulses have orthogonal polarizations. The first series of pulses and the second series of pulses have a same pulse repetition time. The first series of pulses and the second series of pulses are offset by a time amount. A target reflects energy from the first series of pulses to generate a first series of echoes. The target reflects energy from the second series of pulses to generate a second series of echoes. The reception system is configured to process the first series of echoes and the second series of echoes to determine a range and a velocity of the target.

In some example of the invention, the first series of pulses and the second series of pulses each comprise blocks of the pulses, and the transmission system is configured to alternate the blocks from the first series of pulses between a lead position and a lag position with respect to the blocks from the second series of pulses.

In some example of the invention, the transmission system is configured to phase code the first series of pulses and the second series of pulses, and the reception system is configured to decode the phase coding to distinguish ones in the first series of echoes from adjacent ones in the second series of echoes.

In some example of the invention, the orthogonal polarizations are substantially parallel and perpendicular to earth's surface.

In some example of the invention, the reception system is configured to co-process ones in the first series of echoes with adjacent ones in the second series of echoes to determine the velocity of the target.

In some example of the invention, the reception system is configured to co-process adjacent ones in the first series of echoes and co-process adjacent ones in the second series of echoes to determine the range of the target.

In some example of the invention, the pulse repetition time is in a range from one-half millisecond to four milliseconds.

In some example of the invention, the time amount is in a range from one microsecond to 300 microseconds.

In some example of the invention, the target comprises an atmospheric structure.

In some example of the invention, the radar system comprises a Doppler weather radar system.

DESCRIPTION OF THE DRAWINGS

The same reference number represents the same element on all drawings.

DETAILED DESCRIPTION OF THE INVENTION

FIGS. 1–4 and the following description depict a specific example to teach those skilled in the art how to make and use the best mode of the invention. For the purpose of teaching inventive principles, some conventional aspects have been simplified or omitted. Those skilled in the art will appreciate variations from this example that fall within the scope of the invention. Those skilled in the art will appreciate that the features described below can be combined in various ways to form multiple variations of the invention. As a result, the invention is not limited to the specific example described below, but only by the claims and their equivalents.

Figure 1:
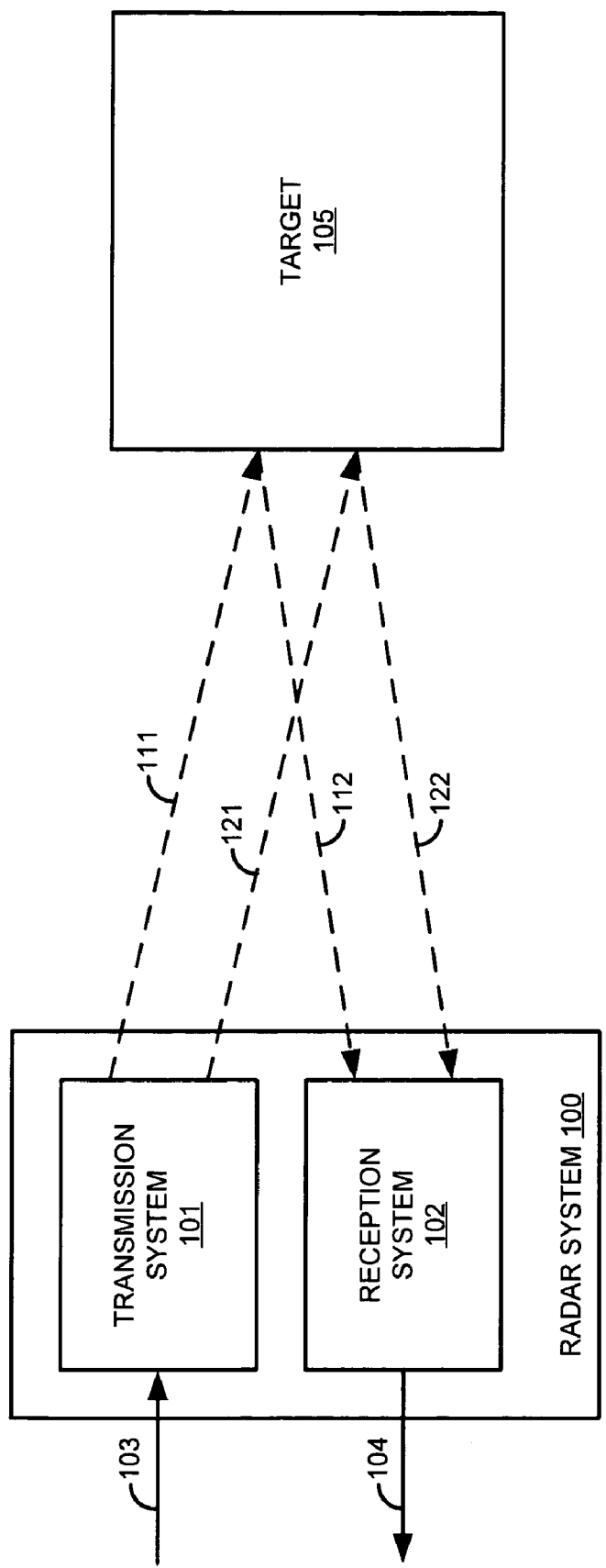
FIG. 1 illustrates a radar system in an example of the invention.

FIG. 1 illustrates radar system 100 in an example of the invention. Radar system 100 determines the range and velocity of target 105. Target 105 could be an atmospheric structure, such as wind or precipitation. Radar system 100 could be a Doppler weather radar system, Lidar system, or other radar-like system.

Radar system 100 includes transmission system 101 and reception system 102. Transmission system 101 receives control signal 103. Transmission system 101 transfers a first series of pulses 111 and a second series of pulses 121 toward target 105. Target 105 reflects energy from first series of pulses 111 to generate first series of echoes 112. Target 105 reflects energy from second series of pulses 121 to generate second series of echoes 122. Reception system 102 receives and processes first series of echoes 112 and second series of echoes 122 to determine the range and velocity of target 105. Reception system 102 provides output signal 104 that indicates the range and velocity of target 105.

Other variables may also be determined by processing the echoes, such as the differential reflectivity, differential phase, linear de-polarization ratio, and co-polar correlation coefficient. The differential reflectivity is the co-polar power differential between echoes 112 and 122. The differential phase is the co-polar phase differential between echoes 112 and 122. The linear de-polarization ratio is a ratio of the cross-polar power to the co-polar power. The co-polar correlation coefficient indicates the degree of similarity between echoes 112 and 122.

Figure 2:
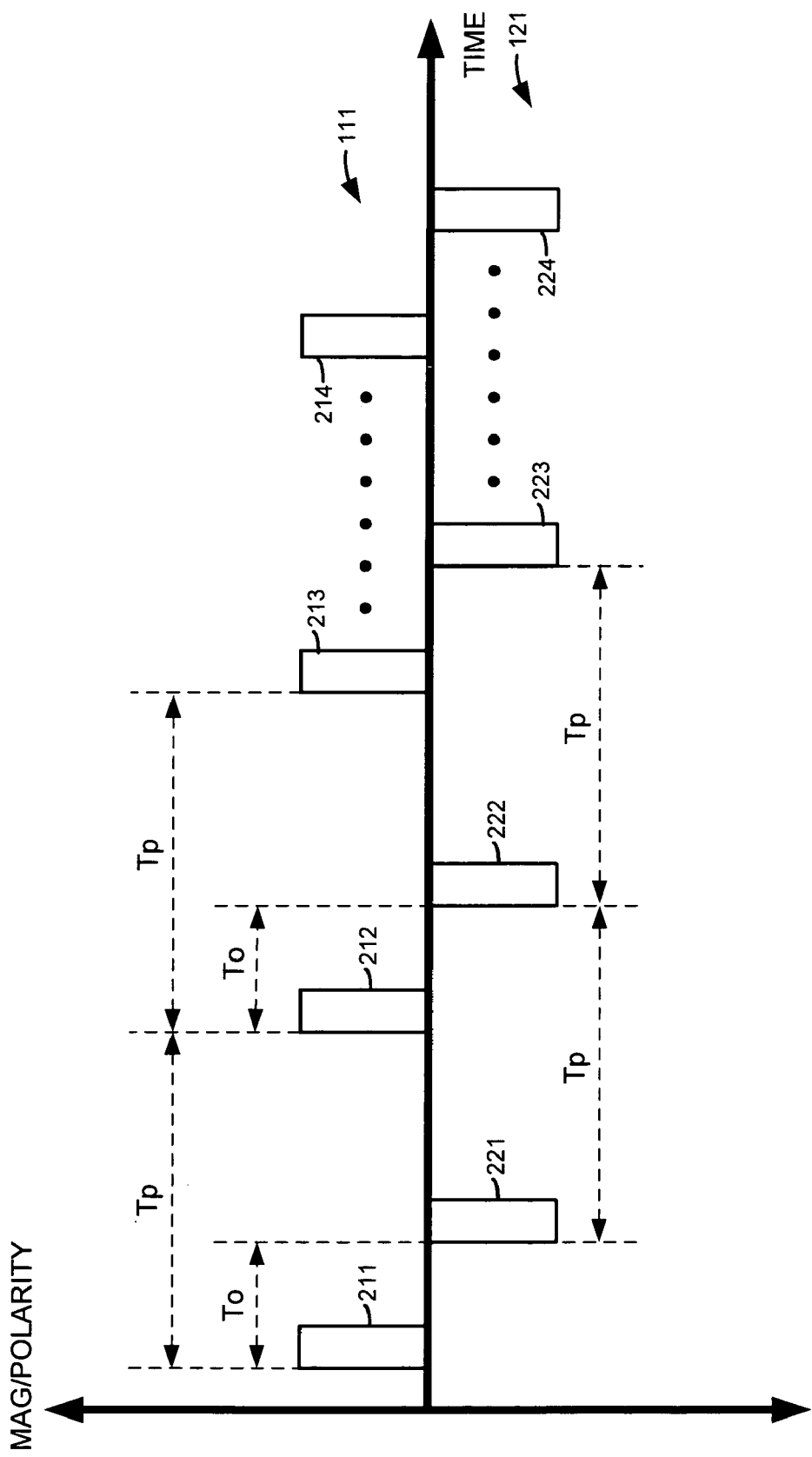
FIG. 2 illustrates a first and second series of pulses in an example of the invention.

FIG. 2 illustrates first series of pulses 111 and second series of pulses 121 in an example of the invention. On FIG. 2, the horizontal axis represents time and the vertical axis represents magnitude and polarity. First series of pulses 111 includes pulses 211–214. Second series of pulses 121 includes pulses 221–224. First series of pulses 111 and second series of pulses 121 both have the same pulse repetition time $T_P$. First series of pulses 111 and second series of pulses 121 are offset from one another by an offset time amount $T_O$, where the first series of pulses 111 leads the second series of pulses 121 by the offset time amount $T_O$.

In some examples, the pulse repetition time $T_P$ is in a range from one-half millisecond to four milliseconds, and the time amount $T_O$ is in a range from one microsecond to 300 microseconds. In addition, control signal 103 may specify new values for $T_O$ and $T_P$, and in response, transmission system 101 would change the prior values of $T_O$ and $T_P$ to the newly specified values for the transmission of pulse series 111 and 121.

First series of pulses 111 and second series of pulses 121 have orthogonal polarizations. On FIG. 2, the pulses above the time axis have a first polarization, and the pulses below the time axis have a second polarization—where the first polarization is orthogonal to the second polarization. For example, the polarization of pulse 211 is orthogonal to the polarization of pulse 221. In some examples, one of the orthogonal polarizations is substantially perpendicular to the earth's surface, and the other one of the orthogonal polarizations is substantially parallel to the earth's surface. These perpendicular and parallel polarizations are respectively referred to as horizontal and vertical polarizations.

To determine the range of target 105, reception system 102 co-processes adjacent echoes from first series of echoes 112 and co-processes adjacent echoes from second series of echoes 122. For example, reception system 102 would co-process echoes for adjacent pulses 211 and 212 in first series of echoes 111, and co-process echoes for adjacent pulses 221 and 222 in second series of echoes 122. The term "co-process" means that data from the echoes are used in the same equations at the same time.

Advantageously, the relatively long time $T_P$ between the adjacent pulses of the same series provides a relatively slow sampling rate to unambiguously determine the target range. The slow sampling rate allows echoes from the prior pulse to clear before echoes from the next pulse in the same series are received. Thus, reception system 102 is unlikely to confuse echoes from adjacent pulses in the same series.

To determine the velocity of target 105, reception system 102 co-processes adjacent echoes from first series of echoes 112 and second series of echoes 122. For example, reception system 102 would co-process echoes for adjacent pulses 211 and 221 and co-process echoes for adjacent pulses 212 and 222.

Advantageously, the relatively short time amount $T_O$ between the adjacent pulses of the different series provides a relatively fast sampling rate to unambiguously determine the target velocity. The fast sampling rate can handle the Doppler frequency shifts of high velocity targets.

Reception system 102 must also distinguish between echoes from the adjacent pulses of the different series where the separation between the adjacent pulses is the short time amount $T_O$. For example, echoes from pulses 211 and 221 must be distinguished. The different polarities of the pulses from the different series can be used to distinguish their respective echoes. To handle cross-polar interference between these pulses, transmission system 101 phase codes first series of pulses 111 differently from second series of pulses 121. Reception system 102 decodes this phase coding to distinguish first series of echoes 112 from second series of echoes 122. For example, reception system 102 uses the phase coding to distinguish the echoes from adjacent pulses 211 and 221, or to distinguish the echoes from adjacent pulses 212 and 222.

Figure 3:
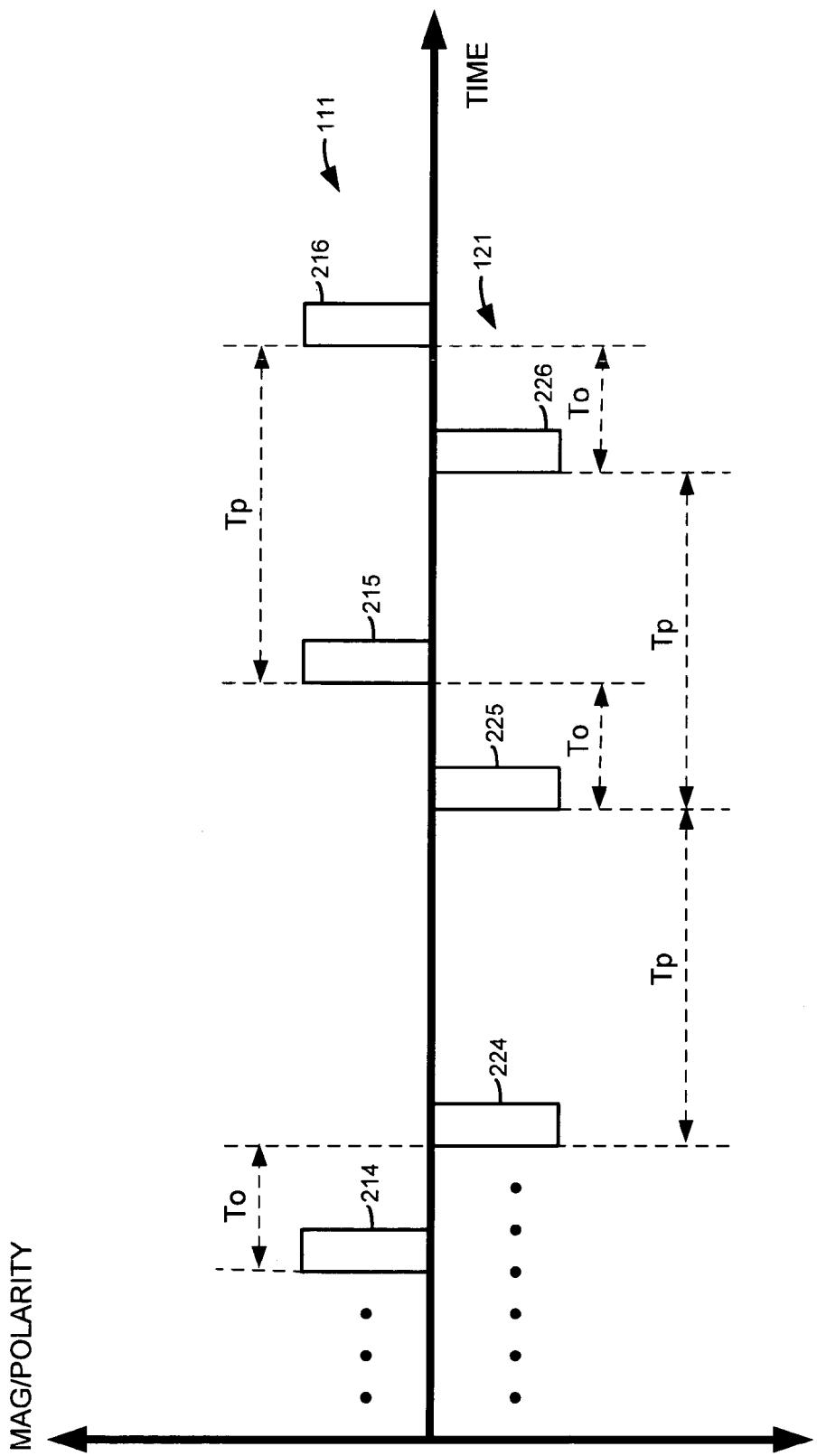
FIG. 3 illustrates a first and second series of pulses in an example of the invention.

FIG. 3 illustrates first series of pulses 111 and second series of pulses 121 in an example of the invention. FIG. 3 is a continuation of FIG. 2, starting with pulses 214 and 224 that appear on both FIGS. 2–3. The second series of pulses 121 continues to use the standard pulse repetition time $T_P$, so pulse 225 follows pulse 224 by $T_P$, and pulse 226 follows pulse 225 by $T_P$. However in the first series of pulses 111, pulse 215 does not follow pulse 214 by the standard pulse repetition time $T_P$, but instead, is delayed by an additional $2T_O$. Starting with pulse 216 (which follows delayed pulse 215), the first series of pulses 111 again uses the standard pulse repetition time $T_P$. Note that until pulses 214 and 224, the first series of pulses 111 led the second series of pulses 121 by the time offset $T_O$, but after pulses 214 and 224, the first series of pulses 111 lags the second series of pulses 121 by the time offset $T_O$. After a set number of pulse pairs (two pulses of different series that are offset by the time amount $T_O$), the above-described pulse delay process will occur for the second series of pulses 121, so that the first series of pulses 111 will again lead the second series of pulses by the offset time $T_O$. This process repeats, so that the first series of pulses 111 and the second series of pulses alternate between leading and lagging one another by the offset time $T_O$.

The lead/lag positioning alternates after a number of pulse pairs, where the number could be in a range of 16–256 or 32–128. Control signal 103 may specify the number of pulse pairs that occur between lead/lag alternation, and in response, transmission system 101 would change the prior number of pulse pairs to the newly specified number of pulse pairs for the transmission of pulse series 111 and 121.

The first series and second series of pulses can each be viewed as blocks of consecutive pulses, such as blocks of 64 pulses. For the first block from each series, the block for the first series leads the block for the second series by the offset time $T_O$. For the second block from each series, the block for the second series leads the block for the first series by the offset time $T_O$. For the third block from each series, the block for the first series leads the block for the second series by the offset time $T_O$. This process repeats, so that consecutive blocks from the same series alternate between the lead and lag position with respect to the blocks of the other series.

Advantageously, alternating the lead/lag positioning of the two series of pulses allows reception system 102 to separate phase shift attributed to the velocity of the target structure (the Doppler phase shift) from other phase shift, such as the other phase shift that is introduced by particles in between the radar system and the target structure. Alternating the lead/lag positioning changes the sign of the Doppler phase shift while leaving the sign of the other phase shift alone, and thus, the Doppler phase shift may be mathematically separated from the other phase shift. The ability to separate the Doppler phase shift from the other phase shift improves the accuracy of the velocity determination.

Even though the lead position alternates between the two pulse series, note that the pulse repetition time $T_P$ for the pulses in both series largely remains the same. Only a single pulse is periodically delayed to alternate the lead position between the two series. Advantageously, the consistent pulse repetition time simplifies ground clutter filtering and phase coding. In contrast, ground clutter filtering and phase coding are relatively complex if the pulse repetition time is allowed to alternate on a pulse-by-pulse basis as is done in some prior systems.

Figure 4:
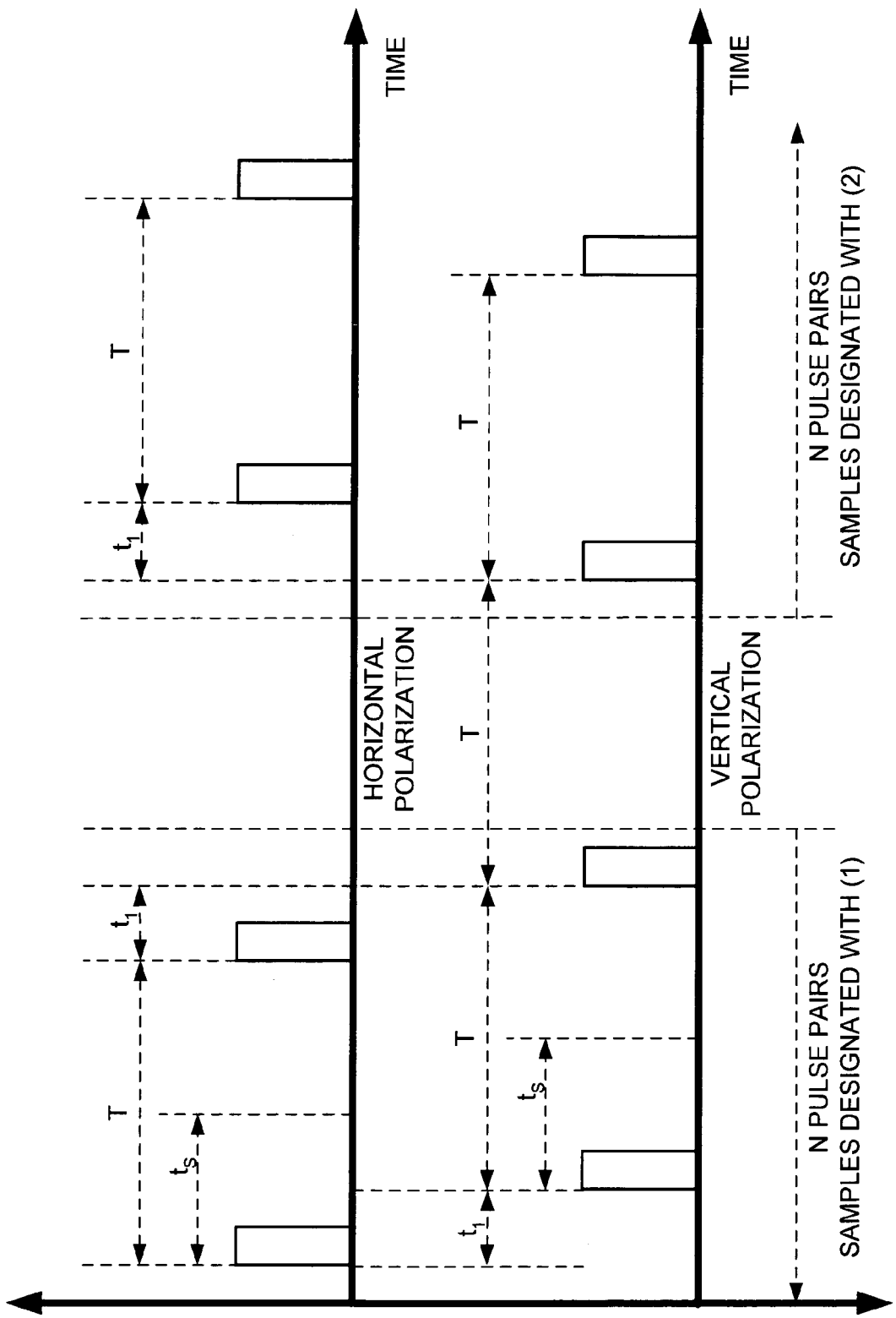
FIG. 4 illustrates radar system processing in an example of the invention.

FIG. 4 and the following section describe the processing that is used by Radar system 100 in one example of the invention to determine the range and velocity of the target, in addition to other variables. Note that other processing variations could be used in other examples of the invention.

1. Staggered H and V Pulse Trains 1.1 Estimation of Copolar and Crosspolar Signals Via Phase Coding First the copolar and crosspolar components of the received horizontal and vertical voltages are estimated via phase coding. Refer to FIG. 4. At time $t_S$ the received voltages are:

$$H^{(1)}(i)=hh^{(1)}(i,\ t_s)\ \exp\{j\phi_i\}+hv^{(1)}(i,\ t_s-t_1)\ \exp\{j\psi_i\} \quad (1)$$

$$V^{(1)}(i)=vv^{(1)}(i,\ t_s)\ \exp\{j\psi_i\}+vh^{(1)}(i,\ t_s+t_1)\ \exp\{j\phi_i\} \quad (2)$$

$$H^{(2)}(i)=hh^{(2)}(i,\ t_s)\ \exp\{j\phi i\}+hv^{(2)}(i,\ t_s+t_1)\ \exp\{j\psi_i\} \quad (3)$$

$$V^{(2)}(i)=vv^{(2)}(i,\ t_s)\ \exp\{j\psi_i\}+vh^{(2)}(i,\ t_s-t_1)\ \exp\{j\phi_i\} \quad (4)$$

where H and V are the received voltages for the horizontal and vertical polarizations, respectively, and where the letter pairs refer to the received and transmitted polarizations. For example, vh is transmit horizontal polarization receive vertical polarization. $\emptyset_i$ and $\psi_i$ are the phase codes applied to the horizontal and vertical transmitted pulses respectively. The letter i represents the time series index for the radar copolar resolution volume defined at time $t_s$, and j is the square root of −1. The superscript (1) refers to the samples obtained when the V pulses lag the horizontal pulses by $t_1$. The superscript (2) refers to the samples obtained when the vertical pulses lead the horizontal pulses by $t_1$. In the equations below, it is assumed that $t_1<t_s<T-t_1$; however, the processing principles are identical.

Before processing the samples to retrieve the desired radar measurables, the copolar and cross polar time series first need to be estimated. Note that in prior systems (Sachidananda and Zrnić), the objective was to estimate only the radar moments of power, velocity and spectrum width. Here we need to obtain the copolar time series so that differential phase, velocity and copolar correlation coefficient can be estimated. The phase codes should be chosen so that overlaid echoes have a unique phase code. For example, if the sequence length is 64 and the SZ(8/64) phase code is chosen, then a good choice is $\psi_i = \phi_i - 3$.

It is possible that second trip echoes may overlay the received voltages given in equations 1, 2, 3 and 4. Under certain conditions, it is possible to separate three or more overlaid signals but in the following discussion it is assumed that only first trip echoes are present, i.e., all significant targets lie within the range cT/2 where c is the velocity of light and T is the pulse repetition time.

Recovery of the weaker echo for overlaid SZ phase coded signals consists of the following steps:

1. Cohere to the stronger signal.
2. Apply an aggressive window function to the resulting time series such as the Hanning window.
3. Apply a Fast Fourier Transform (FFT) to obtain the frequency spectrum.
4. Notch out the strong signal spectrum.
5. Inverse Fast Fourier Transform (IFFT) resulting spectrum.
6. Cohere to the weak signal.

The time series for the strong and weak signal components of the horizontal received signal are designated $S_H$ and $W_H$, respectively, while the time series for the strong and weak signal components of the vertical received signal are designated $S_V$ and $W_V$, respectively. These time series may be either copolar or crosspolar.

The strong signal is estimated as:

$$S_H^{(1)}(i, t_s) = H^{(1)}(i, t_s) \quad (5)$$

$$S_V^{(1)}(i, t_s) = V^{(1)}(i, t_s) \quad (6)$$

or $$S_H^{(2)}(i, t_s) = H^{(2)}(i, t_s) \quad (7)$$

$$S_V^{(2)}(i, t_s) = V^{(2)}(i, t_s) \quad (8)$$

The weak signal time series is recovered via the phase coding recovery algorithm outlined above. After the above processing, time series representing the copolar and crosspolar received signal for both the horizontal and vertical receive channel are available at all times, $t_s$.

The recovered horizontal copolar and crosspolar time series are now designated as, $$\hat{H}^{(1)}(i, t_s), \hat{HV}^{(1)}(i, t_s),$$

respectively, and the recovered vertical copolar and crosspolar time series are now designated as, $$\hat{V}^{(1)}(i, t_s), \hat{VH}^{(1)}(i, t_s),$$

respectively. For the second block of pulses, the superscript (2) replaces the superscript (1).

1.2 Calculating the Radar Variables

The processing steps for the proposed pulsing scheme are:
1. Separate the copolar and cross polar time series, as outlined above.

2. Calculate the copolar powers $P_h$, $P_v$ and crosspolar powers, $P_{vh}$, $P_{hv}$, for time $t_s$ as:

$$P_h = \frac{1}{2N}\sum_{i=1}^{N} \hat{H}_i^{(1)} + \hat{H}_i^{(2)} \quad (9)$$

$$P_v = \frac{1}{2N}\sum_{i=1}^{N} \hat{V}_i^{(1)} + \hat{V}_i^{(2)} \quad (10)$$

$$P_{xh} = \frac{1}{2N}\sum_{i=1}^{N} \hat{VH}_i^{(1)} + \hat{VH}_i^{(2)} \quad (11)$$

$$P_{xv} = \frac{1}{2N}\sum_{i=1}^{N} \hat{HV}_i^{(1)} + \hat{HV}_i^{(2)} \quad (12)$$

3. Correct the strong signal power by subtracting the weak signal power if $10 \log P_s/P_w < 20$ dB where $P_s$, $P_w$ are the strong and weak signal powers.
4. Calculate $Z_{dr}$ (copolar differential reflectivity) and $LDR_h$ (linear depolarization ratio for horizontal transmit polarization) as:

$$Z_{dr} = \frac{P_h}{P_v} \quad (13)$$

$$LDR = \frac{P_{xh}}{P_h} \quad (14)$$

5. Calculate the copolar differential phase and velocity phase:

$$\theta_1 = \phi_{dp} - \phi_{vel} = \arctan\sum_{i=1}^{N} \hat{V}_i^{(1)} \hat{H}_i^{*(1)} \quad (15)$$

$$\theta_2 = \phi_{dp} + \phi_{vel} = \arctan\sum_{i=1}^{N} \hat{V}_i^{(2)} \hat{H}_i^{*(2)} \quad (16)$$

$$\phi_{vel} = (\theta_2 - \theta_1)/2 \quad (17)$$

$$\phi_{dp} = (\theta_2 + \theta_1)/2 \quad (18)$$

where * represents complex conjugation.

6. If $t_1$ is short, the standard deviation of this above velocity phase estimate, $\emptyset_{vel}$, can be high, but the associated Nyquist folding velocity will be high as compared to the Nyquist folding velocity associated with the time interval T. Thus, velocity phase is also calculated using the first lag autocovariance of the copolar vertical polarized samples as, $$\phi_{vel\_T} = \arctan\left\{\left[\sum_{i=1}^{N-1} \hat{V}_i^{(1)} \hat{V}_{i+1}^{*(1)}\right] + \left[\sum_{i=1}^{N-1} \hat{V}_i^{(2)} \hat{V}_{i+1}^{*(2)}\right]\right\}. \quad (19)$$

This velocity phase $\emptyset_{vel\_T}$ will have a lower Nyquist folding velocity than the velocity phase estimate $\emptyset_{vel}$ but the standard deviation of the velocity phase estimate $\emptyset_{vel\_T}$ will in general be lower than the standard deviation of the velocity phase estimate $\emptyset_{vel}$ for small $t_1$. Therefore, the velocity phase estimate $\emptyset_{vel}$ can be used to place the velocity phase estimate $\emptyset_{vel\_T}$ in the correct Nyquist interval thereby by giving a velocity phase estimate with a high Nyquist phase and a low standard deviation.

7. To calculate the copolar correlation coefficient, magnitude deconvolution should be applied to the recovered weak signal time series that resulted after step 6 of the phase coding outline in section 1.1 above. After applying magnitude deconvolution to the copolar time series, if needed, the copolar correlation coefficient is calculated as, $$\rho_{hv} = \left[ \frac{\left| \sum_{i=1}^{N} \hat{V}_i^{(1)} \hat{H}_i^{*(1)} \right|}{\sqrt{\sum_{i=1}^{N} \hat{V}_i^{(1)} \hat{V}_i^{*(1)} \sum_{i=1}^{N} \hat{H}_i^{(1)} \hat{H}_i^{*(1)}}} + \frac{\left| \sum_{i=1}^{N} \hat{V}_i^{(2)} \hat{H}_i^{*(2)} \right|}{\sqrt{\sum_{i=1}^{N} \hat{V}_i^{(2)} \hat{V}_i^{*(2)} \sum_{i=1}^{N} \hat{H}_i^{(2)} \hat{H}_i^{*(2)}}} \right] \Big/ 2 \quad (20)$$

If the time $t_1$ is small so that there is very small decorrelation between the $H_i$ and $V_i$ signals, the above estimate of $\rho_{hv}$ in equation 20 can consider the zero lag correlation coefficient between the $H_i$ and $V_i$ time series with very little error.

The invention claimed is:

1. A method of operating a radar system comprising:
   transferring a first series of pulses and a second series of pulses;
   wherein the first series of pulses and the second series of pulses have orthogonal polarizations;
   wherein the first series of pulses and the second series of pulses have a same pulse repetition time;
   wherein the first series of pulses and the second series of pulses are offset by a time amount;
   wherein a target reflects energy from the first series of pulses to generate a first series of echoes;
   wherein the target reflects energy from the second series of pulses to generate a second series of echoes; and
   processing the first series of echoes and the second series of echoes to determine a range and a velocity of the target.

2. The method of claim 1 wherein the first series of pulses and the second series of pulses each comprise blocks of the pulses, and wherein the blocks from the first series of pulses alternate between a lead position and a lag position with respect to the blocks from the second series of pulses.

3. The method of claim 2 further comprising phase coding the first series of pulses and the second series of pulses and wherein processing the first series of echoes and the second series of echoes comprises decoding the phase coding to distinguish ones in the first series of echoes from adjacent ones in the second series of echoes.

4. The method of claim 3 wherein the orthogonal polarizations are substantially parallel and perpendicular to earth's surface.

5. The method of claim 3 wherein processing the echoes to determine the velocity of the target comprises co-processing ones in the first series of echoes with adjacent ones in the second series of echoes.

6. The method of claim 3 wherein processing the echoes to determine the range of the target comprises co-processing adjacent ones in the first series of echoes and co-processing adjacent ones in the second series of echoes.

7. The method of claim 3 wherein the pulse repetition time is in a range from one-half millisecond to four milliseconds.

8. The method of claim 3 wherein the time amount is in a range from one microsecond to 300 microseconds.

9. The method of claim 3 wherein the target comprises an atmospheric structure.

10. The method of claim 3 wherein the radar system comprises a Doppler weather radar system.

11. A radar system comprising:
    a transmission system configured to transfer a first series of pulses and a second series of pulses, wherein the first series of pulses and the second series of pulses have orthogonal polarizations, wherein the first series of pulses and the second series of pulses have a same pulse repetition time, wherein the first series of pulses and the second series of pulses are offset by a time amount, wherein a target reflects energy from the first series of pulses to generate a first series of echoes, and wherein the target reflects energy from the second series of pulses to generate a second series of echoes; and
    a reception system configured to process the first series of echoes and the second series of echoes to determine a range and a velocity of the target.

12. The radar system of claim 11 wherein the first series of pulses and the second series of pulses each comprise blocks of the pulses, and wherein the transmission system is configured to alternate the blocks from the first series of pulses between a lead position and a lag position with respect to the blocks from the second series of pulses.

13. The radar system of claim 12 wherein the transmission system is configured to phase code the first series of pulses and the second series of pulses and wherein the reception system is configured to decode the phase coding to distinguish ones in the first series of echoes from adjacent ones in the second series of echoes.

14. The radar system of claim 13 wherein the orthogonal polarizations are substantially parallel and perpendicular to earth's surface.

15. The radar system of claim 13 wherein the reception system is configured to co-process ones in the first series of echoes with adjacent ones in the second series of echoes to determine the velocity of the target.

16. The radar system of claim 13 wherein the reception system is configured to co-process adjacent ones in the first series of echoes and co-process adjacent ones in the second series of echoes to determine the range of the target.

17. The radar system of claim 13 wherein the pulse repetition time is in a range from one-half millisecond to four milliseconds.

18. The radar system of claim 13 wherein the time amount is in a range from one microsecond to 300 microseconds.

19. The radar system of claim 13 wherein the target comprises an atmospheric structure.

20. The radar system of claim 13 wherein the radar system comprises a Doppler weather radar system.

* * * * *

UNITED STATES PATENT AND TRADEMARK OFFICE
CERTIFICATE OF CORRECTION

PATENT NO. : 7,053,813 B1 Page 1 of 1
APPLICATION NO. : 10/829602
DATED : May 30, 2006
INVENTOR(S) : John Clark Hubbert and Venkatachalam Chandraskaran It is certified that error appears in the above-identified patent and that said Letters Patent is hereby corrected as shown below:

TITLE PAGE
Item (75) Inventors:
Replace "Venkatachalam Chandraskaran, Fort Collins, CO (US)"
with --Venkatachalam Chandrasekar, Fort Collins, CO (US)--

Signed and Sealed this

Seventh Day of November, 2006

JON W. DUDAS
*Director of the United States Patent and Trademark Office*

UNITED STATES PATENT AND TRADEMARK OFFICE
CERTIFICATE OF CORRECTION

PATENT NO. : 7,053,813 B1
APPLICATION NO. : 10/829602
DATED : May 30, 2006
INVENTOR(S) : John Clark Hubbert and Venkatachalam Chandraskaran It is certified that error appears in the above-identified patent and that said Letters Patent is hereby corrected as shown below:

Title Page,
Item (75) Inventors:
replace "Venkatachalam Chandraskaran, Fort Collins, CO (US)"
with --Venkatachalam Chandrasekar, Fort Collins, CO (US)--

Signed and Sealed this

Nineteenth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,053,813 B1 Page 1 of 1
APPLICATION NO. : 10/829602
DATED : May 30, 2006
INVENTOR(S) : John Clark Hubbert and Venkatachalam Chandrasekar It is certified that error appears in the above-identified patent and that said Letters Patent is hereby corrected as shown below:

Title Page,
Item (73) Assignee:

Add-- Colorado State University
Office of the General Counsel
202 Administration Building
Fort Collins, Colorado 80523 --

Signed and Sealed this

Eleventh Day of September, 2007

JON W. DUDAS
*Director of the United States Patent and Trademark Office*